Aug. 31, 1954 D. H. FAIREST 2,687,821
LABELING MACHINE
Filed Dec. 10, 1951 3 Sheets-Sheet 1
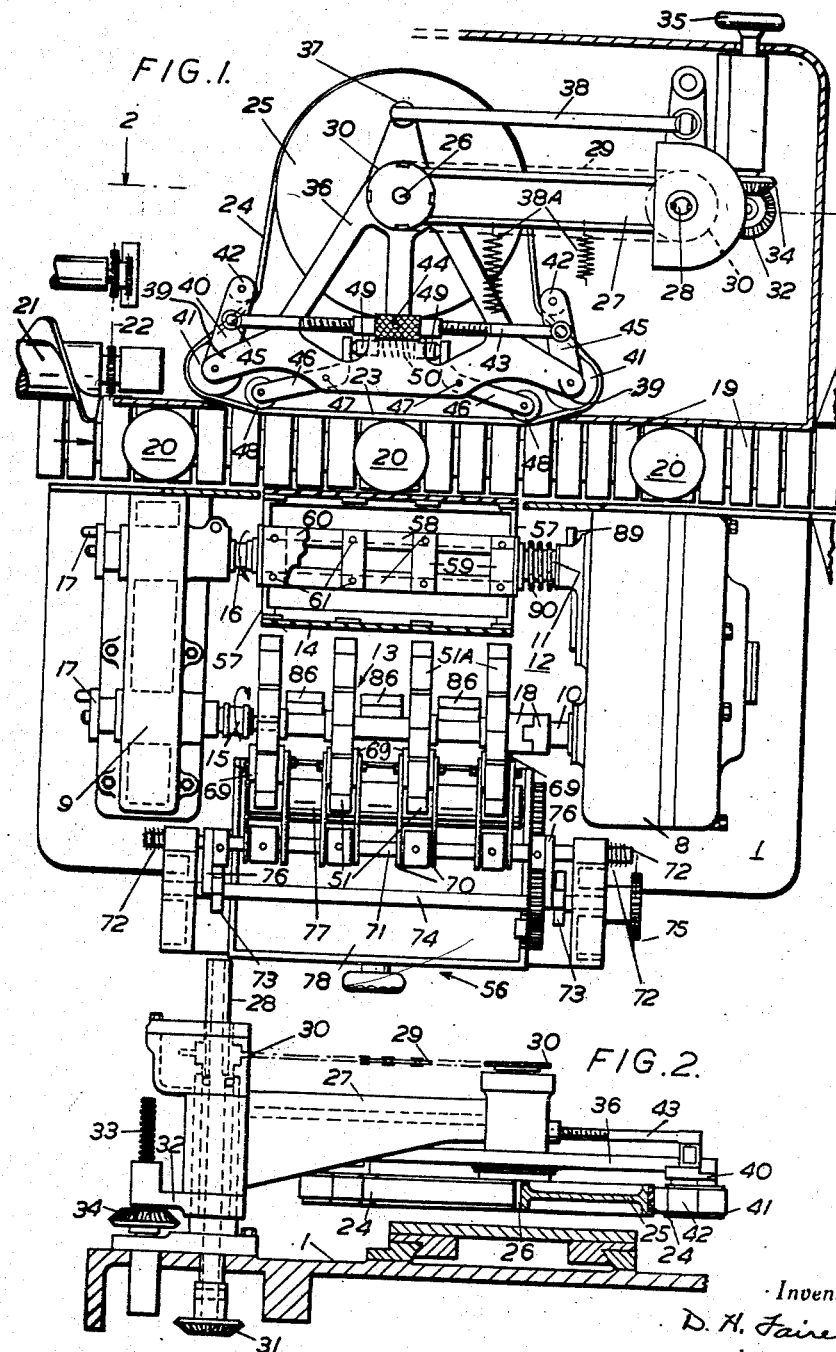
Inventor
D. H. Fairest
By Watson, Cole,
Grindle & Watson
Attorney

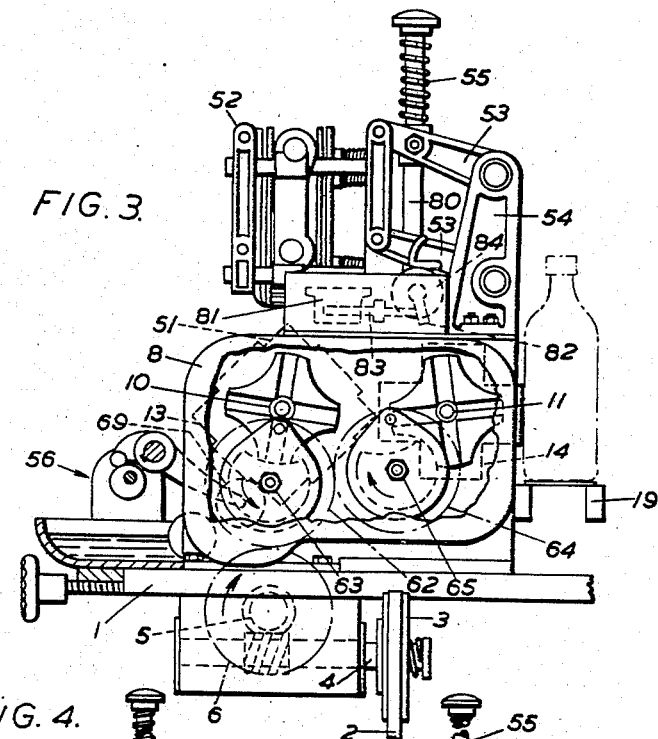
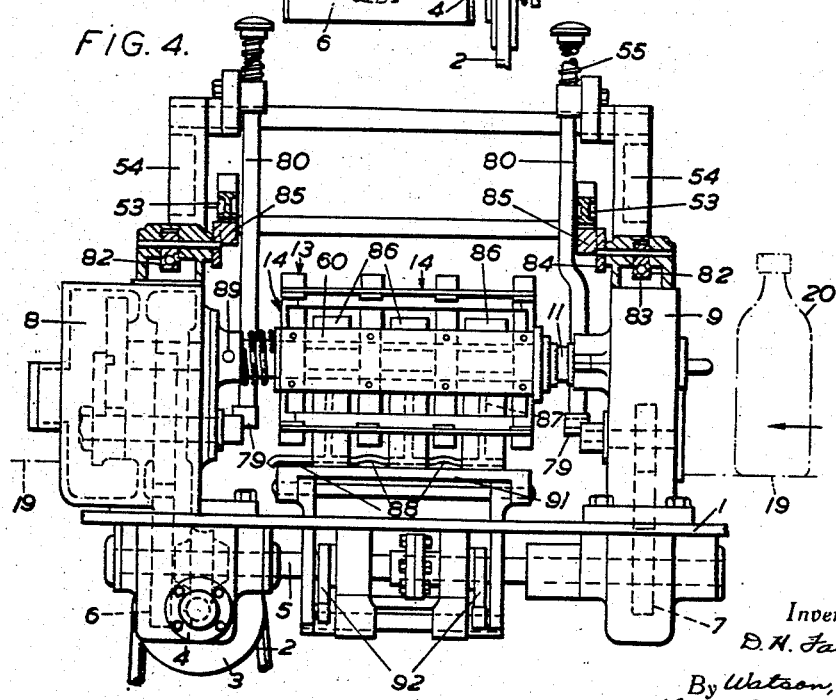

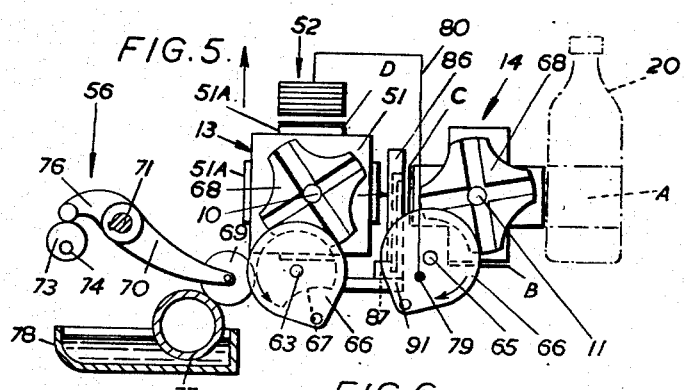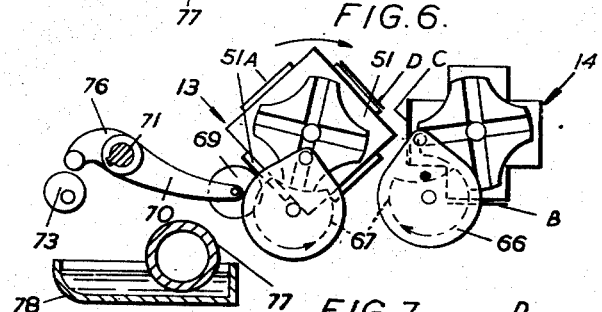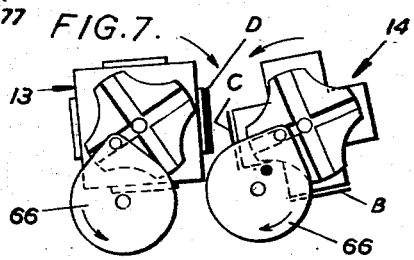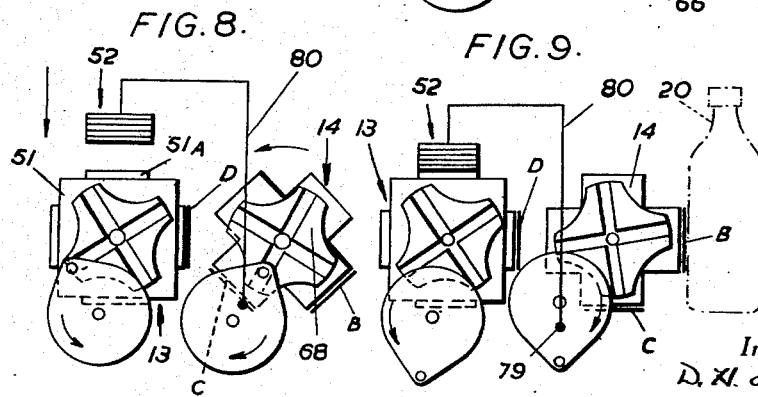

Patented Aug. 31, 1954

2,687,821

UNITED STATES PATENT OFFICE 2,687,821

LABELING MACHINE

Derek Howard Fairest, Sheffield, England, assignor to Morgan Fairest Limited, Sheffield, England Application December 10, 1951, Serial No. 260,921

Claims priority, application Great Britain December 11, 1950

8 Claims. (Cl. 216—54)

This invention relates to labelling machines of the type in which a label is presented, gummed-side out, by a delivery plate lying alongside the feed path of a bottle or other cylindrical article, which then receives the label by being rolled over it. Between successive applications of labels to successive articles, the delivery plate moves away from the feed path to receive another label; and, to bring the operative face of the delivery plate into a convenient label-receiving position, the most suitable movement is one of rotation. For the application of relatively small labels, the axis of rotation of the delivery plate may be parallel to the axis of an article in the feed path; but for the application of a long label (as may be required to pass completely round an article, or substantially so), the rotation about a vertical axis of a delivery plate having a width necessarily corresponding to the length of the label would lead to various disadvantages among which may be mentioned (a) an unduly wide sweep of the plate into the feed path during rotation, and (b) an increase in the inertia of the delivery plate mechanism and associated mechanism. The first of these would tend to reduce the frequency with which articles could be fed to the delivery plate, and the second to reduce operating rate, the combined result being substantially diminished throughout. In addition, the assembly of delivery plate mechanism and associated mechanism for feeding labels to the delivery plate mechanism would tend to be cumbrous.

According to the present invention, a labelling machine of the type in which a delivery plate is movable to a position alongside a feed path for cylindrical articles, to present, gummed-side out, a label for application to an article rolled over the plate, comprises means for moving the articles in succession along the feed path with their axes at right angles to the path, a delivery plate mounted for rotation about an axis parallel to the path, means to rotate the delivery plate about its axis so that it may be brought to a position away from the path to receive a label and then to a position alongside the path, and means to roll an article in the path over the plate when the plate lies alongside the path.

It being most usually convenient for the articles to stand upright in a horizontal conveyor running along the feed path, the axis of rotation of the delivery plate is then horizontal. The following description will be particularly directed to a delivery plate with a horizontal axis of rotation.

A four-sided box, rotatable by quarter-turns between the passage of successive articles, provides four delivery plates to present labels in succession. The box may have a skeleton structure to minimise weight, with each "plate" reduced to a number of areas sufficient to support a label and to receive the rolling contact of the article.

A suitable means for rolling the article over the length of the delivery plate comprises an endless band with a driving pulley, and also with guide pulleys disposed within the run along the other side of the feed path from the delivery plate position to provide an operative rolling run over the length of the delivery plate, and tension pulley mechanism engaging the band between the operative run and the driving pulley. The guide pulleys may be pivotally mounted, with means such as bell-crank levers and a compression spring to urge the rollers independently against the operative run.

To present labels to the delivery plate, a pick-up box rotatable about an axis parallel to that of the delivery plate and consisting of plates disposed normal to its axis at spaced intervals may be used. With gum applied to the thick edges of the plates (or to protruding pads), labels may be withdrawn from a stack, and then detached by transfer pushers movable from between the plates towards the delivery plate. The transfer pushers and the delivery plates conveniently hold the labels by suction, the former between the stripes of gum received from the pick-up box, the latter at the ungummed side. This construction of pick-up box may be made very light in weight.

Gum may be applied during the rotation of the pick-up box by a roller urged towards the box by a spring under cam control that also serves to bring the roller alternately into contact with a gum supply roller.

The invention will now be described in greater detail with reference to the accompanying drawings, in which Figure 1 is a plan view (with cover and other parts omitted) of the essential mechanism of a labelling machine;

Figure 2 is a part-sectional view taken on the line 2—2 of Figure 1;

Figure 3 is an end elevation (viewed from the right) with parts broken away of the front portion of the machine shown in Figure 1;

Figure 4 is an elevation of Figure 3 viewed from the right; and

Figures 5 to 9 are diagrams showing different stages in the operation of the machine.

In Figures 1 to 4, a table 1 carries above it the main elements of the machine, and below it the main driving mechanism, a belt 2 from a motor (not shown) driving a pulley 3 on a worm shaft 4 by which a longitudinal shaft 5 is driven. Gears 6, 7 on the shaft 5 provide driving connections to gear-boxes 8, 9 above the table 1, and a pick-up axis 10 and a delivery axis 11 extend between the gear-boxes, the intervening space 12 being sufficient to receive a pick-up "box" 13 and a delivery "box" 14, both of a length adequate for the longest label to be applied. The boxes 13, 14 are readily removable, being secured between live centres 15, 16 protruding from the gear-box 9 (the centres being adjusted by hand-wheels 17) and by dog-clutches at the ends next to the gear-box 8, the clutch 18 for the pick-up box being clearly shown in Figure 1. Interchange of both boxes, e. g., for cleaning or for handling different sizes and shapes of label, is thus easily effected.

The axes 10, 11 are parallel to the length of a slot conveyor 19 by which articles, shown as bottles 20, are carried through the machine. The conveyor 19 is driven (by gearing not shown) in synchronism with the shaft 5. A feed worm 21 alongside the conveyor, rotated in synchronism by a chain drive 22, receives the bottles at the left-hand side of the machine and releases them at spaced intervals, three spaced bottles being shown in Figure 1. The conveyor speed is such that a bottle is presented to the delivery box 14 just after each quarter-turn of the latter, as will shortly be explained.

Parallel with the conveyor 19 and lying opposite the delivery box 14 is a straight run 23 of a band 24 driven by a large pulley 25 on a vertical shaft 26 carried by an arm 27 swinging about a vertical driving shaft 28, a chain 29 extending between sprockets 30 enabling the pulley 25 to be driven by rotation of the shaft 28 by gearing (not shown) meshing with a bevel pinion 31 at the foot of the shaft 28. The arm 27 is adjustable vertically by a bracket 32 fitting a screwed spindle 33 rotated by bevel gearing 34 operated by a hand-wheel 35 (Figure 1). The band 24 may thus be brought to any height required for engagement with the bodies of bottles 20 on the conveyor 19.

Swinging on the pulley shaft 26 is a triangular frame 36, the apex 37 of which is connected by a link 38 parallel to the arm 27, whereby the shaft 26 may be adjusted towards and away from the conveyor 19 and yet the run 23 of the band is maintained parallel to the conveyor. The arm 27 is urged to the position shown in Figure 1 by strong springs 38A, which keep the whole of the mechanism associated with the arm 27 against a stop (not shown) and permit the mechanism to recede from the conveyor if a bottle is accidentally displaced in its passage through the machine. At each end 39 of the base of the frame 36, arms 40 are pivoted concentrically with pulleys 41 inside the band 24, and provide turning points for the ends of operative runs, and the free ends of the arms carry tension pulleys 42 outside the band. A rod 43, with a turn-buckle 44, is pivoted at 45 to the levers 40 to enable the band 24 to be tensioned. Bell-crank levers 46 pivoted at 47 carry rollers 48 at the inside of the band run 23 and plungers 49 with an intermediate compression spring 50 force the rollers 48 against the band. Thus the run 23 is resiliently urged against each bottle, and adjusts itself to both minor variations in bottle diameter and to slight eccentricity in any bottle.

The pick-up "box" consists of four generally square thick-edged plates 51 (Figure 1) at spaced intervals, each side of which has an interchangeable pad 51A of a length equal to the width of label to be applied, the width of the label extending up the height of the bottle. The plates 51 provide for the application of four stripes of gum to each label, two of the stripes being at the ends of the label.

Above the pick-up box position is a label stack 52 (shown in Figure 3; but omitted from Figure 1) carried by arms 53 swinging from a bracket 54 and urged downwardly by springs 55, so that there is a tendency for the lowermost label in the stack 52 to be pressed towards the pick-up box 13. The label stack mechanism is described in detail later.

In front of the pick-up box position is a gumming device 56 (described in detail later) by means of which each pad 51A of the pick-up box 13 is coated with gum, so that that pad later presents its gum to the lowermost label, the label then adhering to the pad for subsequent transfer to the delivery box 14.

The delivery box 14 consists of end plates 57, between which extend pairs of channels 58, and four short strips 59 connect each pair 58 to provide a support for a sheet of plastic material 60 of a length and width corresponding to these dimensions of the label. Suction holes 61 are provided through the strips 59 and sheet 60, by means of which the outer (ungummed) face of a label is caused to adhere to the delivery box. Rotation of the box 14 then brings the gummed face of the label alongside the conveyor 19 and opposite the belt run 23, for the label to adhere to and to be rolled round a bottle.

The pick-up and delivery boxes 13, 14 being four sided, they are each rotated by quarter-turns, with a stationary interval between each rotation. This is effected by Geneva-stop mechanisms in the gear-box 8. The gear 6 (Figure 3) on the shaft 5 meshes with a gear 62 on an axis 63, and that in turn meshes with a gear 64 on an axle 65. Each axle carries a driving pin member 66 (Figure 5) and a locking member 67 for a corresponding slotted cross-member 68, one on each of the axes 10, 11, to give quarter-turns and stationary intervals in the well-known manner. The relative positions of 10, 11, 63, 65 and the angular positions of the Geneva-stop mechanisms are such that the quarter-turns of the pick-up and delivery boxes 13, 14 are out of step with each other, though in phase.

Figures 5 to 9 show several stages from one position to the next in which sides of the stationary boxes 13, 14 face each other:

In Figure 5, a bottle 20 has just received a label A and at this time it is leaving the right-hand end (Figure 1) of the band run 23. The underside of the box 14 is holding a label B by suction. The side of the box 14 facing a side of the box 13 has just received a label C (by transfer mechanism to be described later). The upper side of the box 13 has just received a label D from the stack 52 (with the stack 52 now being lifted), and the side of the box 13 nearest the gumming device 56 has just received more gum.

Figure 6 shows the box 13 to have moved before the box 14 moves. This permits close spacing of the boxes, without interference as the diagonal corner of the box 13 approaches the still stationary nearest face of the box 14. During this movement, the underside of the box 13 receives gum, and the label D last taken from the stack 52 is brought towards the box 14.

In Figure 7, the box 14 has also moved slightly, clear of interference with the box 13, and it is continuing its movement in Figure 8, when the box 13 is once again at rest. At this time, the label stack 52 is approaching the upper side of the box 13, and has reached it by the time the box 14 has come to rest, as shown in Figure 9. In Figure 9, the label D is about to be transferred from the box 13 to the box 14, and the label B on the box 14 is about to be rolled on to the next bottle. The label C remains attached to the underside of the box 14.

The gum is applied to the pads 51A of the pick-up box 13 by spaced rollers 69 on arms 70 carried by a shaft 71, with coiled springs 72 urging the rollers 69 upwardly. Cams 73 on a shaft 74 driven by a sprocket 75 engage follower levers 76 to bring the rollers 69 into contact with a gum roller 77 in a trough 78 and then to permit the rollers 69 to move upwardly until they are just clear of the face of the approaching side of the plates 51. This permits the protruding face of the pads 51A to sweep over the rollers 69 to receive a sufficient quantity of gum, the springs 72 allowing the rollers to follow the faces of the pads—at which time the cams 73 no longer contact the follower levers 76.

The label stack 52 is brought towards the pick-up box 13 by cranks 79 (Figure 4) driven by the gear-boxes 8, 9 to operate pull rods 80 by which the springs 55 are compressed. The stack 52 may be put out of operation by a solenoid 81 (Figure 3) at each side, energisation of which rocks a lever 82 through a link 83, which in turn rocks a disc 84 with a side projection 85 to bring the projection under the lowermost arm 53. The cranks 79 then merely compress the springs 55, but no label is applied to the pick-up box. The solenoids 81 may be energised if the absence of a bottle 20 in the spaced sequence along the conveyor 19 fails to move a feeler (not shown), so that no label is presented by the delivery box 14 at the time when the missing bottle should have been rolled over the box.

The transfer of labels from the box 13 to the box 14 is effected by three pushers 86 (Figures 1, 4, and 5) lying between the plates 51 of the box 13 with suction passages 87 emerging at their faces opposite to the box 14, suction being applied by tubes 88 from a source of suction controlled by a valve (not shown) operating in sequence to apply suction to the pushers as they contact between the gummed stripes on a label and to break the suction as the label is taken over by the box 14. The suction openings 61 of the box 14 are connected by a tube 89 (Figure 1) at the connection of the box 14 with the gear-box 8, a rotary seal 90 being provided between the box 13 and the box 8. The suction may be continuous at the box 14, so as to be immediately available as a label is presented by the suction pushers 86, the subsequent gummed adhesion of the label to the bottle being sufficient to overcome the suction adhesion to the box 14.

The pushers 86 are mounted on a carrier 91 (Figure 4) moved towards and from the location of the box 14 by cams 92 on the shaft 5 under the table 1.

The lengthwise direction of the labels in the stack 52 is accurately adjusted so that when the label reaches the bottle it is accurately aligned, as is especially important for a label that wraps the bottle completely, when the ends of its upper and lower edges respectively must meet each other in the same line. Since the label is held by gum to the box 13, by suction to the pushers 86, and by suction to the box 14, it remains under control until it is placed in the desired position on the bottle.

The "skeleton" construction of the delivery "box" 14, with its channels 58 to provide rolling surfaces, and the strips 59 to provide suction supports for the labels, is capable of performing rapid quarter-turns under the control of its Geneva-stop mechanism, and thus brings a succession of labels alongside the conveyor 19 for the rapid labelling of the bottles 20. The out-of-phase operation of the two Geneva stop mechanisms allows close spacing of the pick-up and delivery boxes 13, 14, to shorten the gap over which the pushers 86 move to transfer a label from one box to the other; and the pick-up box construction permits rapid quarter-turns under the control of its Geneva-stop mechanism.

The crank operation of the label stack 52 permits accurate removal of a label in the interval of rest of the pick-up box 13. The gumming mechanism 56, besides applying gum while the pick-up box 13 is in motion, is compact and occupies a low level, which does not interfere with access to and observation of the label stack.

Apart from facilitating the application of a long label for complete (or substantially complete) encirclement of an article, the invention may be used for applying more than one label to an article at different positions round the periphery of the article. Thus, an article may be rolled in turn over two labels presented at different positions along the length of the delivery plate, the spacing of the labels being in accordance with the positions (usually diametrically opposite each other) to be occupied on the article. In this case, two separate label stacks 52 are required, but both are operated simultaneously. Two of the plates 51 of the pick-up box and two of the strips 59 of the delivery box serve for each of the two labels.

Whether one or two labels are to be applied, it is convenient to have the whole delivery box 14 interchangeable for different sizes of labels, but the pads 51A of the pick-up box 13 are the only parts of that mechanism that need to be interchanged.

What I claim is:

1. A labelling machine of the type including a feed path for cylindrical articles, a multi-sided delivery member alongside the feed path, with suction openings in its sides, a multi-sided pick-up member alongside the delivery member, a device adapted to apply gum to the sides of the pick-up member, a label stack adapted to apply labels to the gummed sides of the pick-up member, means for rotating the delivery and pick-up members, a transfer pusher for detaching a label from the pick-up member and applying it to the delivery member, and means for rolling articles in turn along the feed path over labels held by suction gummed-side out to the sides of the delivery member, the delivery member and the pick-up member being disposed for rotation about axes substantially parallel to the length of the feed path, with the pick-up member consisting of spaced multi-sided plates disposed normal to its axis, and with the transfer pusher consisting of fingers alternating with the spaced plates.

2. A labelling machine as in claim 1, comprising protruding pads on the edges of the spaced pick-up plates, the pads on one side of the box first receiving the gum and then a label extending over the pads and over the spaces between the pads.

3. A labelling machine as in claim 1, comprising pads interchangeably mounted on the edges of the spaced pick-up plates and forming protrusions lengthwise of those edges in accordance with the width of label, the pads on one side of the box first receiving the gum and then a label extending over the pads and over the spaces between the pads.

4. A labelling machine of the type including a feed path for cylindrical articles, a multi-sided delivery member alongside the feed path, with suction openings in its sides, a multi-sided pick-up member alongside the delivery member, a device adapted to apply gum to the sides of the pick-up member, a label stack adapted to apply labels to the gummed sides of the pick-up member, means for rotating the delivery and pick-up members, a transfer pusher for detaching a label from the pick-up member and applying it to the delivery member, and means for rolling articles in turn along the feed path over labels held by suction gummed-side out to the sides of the delivery member, the delivery member and the pick-up member being disposed for rotation about axes substantially parallel to the length of the feed path, with the pick-up member consisting of spaced multi-sided plates disposed normal to its axis, and with the transfer pusher consisting of fingers alternating with the spaced plates, the rolling means being of the endless band type, with two resiliently mounted guide pulleys defining an operative run of the band on the other side of the feed path from the delivery member, and two pulleys disposed beyond the guide pulleys to provide turning points for the band, between which turning points the operative run of the band is yieldingly urged towards the delivery member by the resiliently mounted pulleys.

5. A labelling machine as in claim 4, comprising two bell-crank levers, one arm of each lever carrying one of the guide pulleys, and a compression spring disposed between the other arms of the levers to urge both pulleys simultaneously but independently against the operative run of the band.

6. A labelling machine as in claim 4, comprising an arm pivoted about the axis of each turning pulley, a tension pulley on the end of the arm to engage the outside of the band on the side of the turning pulley remote from the operative run of the band, and a common tension rod connecting intermediate points of the two arms to urge the tension pulleys against the band.

7. A labelling machine comprising a feed path for cylindrical articles, means for moving articles in succession along the path, with their axes at right angles to the path, a four-sided delivery box mounted for rotation about an axis parallel to the path, with each side movable in turn alongside the path, means for rotating the delivery box by quarter-turns, a four-sided pick-up box mounted for rotation about a further parallel axis, means for rotating the pick-up box by quarter-turns out-of-phase with the delivery box, the two parallel axes being so close that out-of-phase movements are necessary to avoid interference between the boxes, gumming means for the sides of the pick-up box, a label stack, means for moving the stack whereby a gummed side of the pick-up box receives a label, gaps in the sides of the pick-up box, a transfer pusher for detaching a label from the pick-up box, and means for moving the pusher to detach a label and transfer it to a side of the delivery box.

8. A labelling machine as in claim 7, wherein the pick-up box consists of square plates disposed normal to its axis so as to be spaced along the lengthwise direction of the delivery box and to provide between themselves gaps in the sides of the pick-up box, and a transfer pusher is movably mounted to operate through the gaps.

References Cited in the file of this patent

UNITED STATES PATENTS

| Number | Name | Date |
| --- | --- | --- |
| 557,180 | Anthon | Mar. 31, 1896 |
| 2,224,496 | Wild et al. | Dec. 10, 1940 |
| 2,354,688 | Kimball et al. | Aug. 1, 1944 |
| 2,391,694 | Everett | Dec. 25, 1945 |
| 2,509,902 | Banks | May 30, 1950 |
| 2,524,945 | Von Hofe | Oct. 10, 1950 |
| 2,545,292 | Magnusson | Mar. 13, 1951 |
| 2,586,983 | Newman et al. | Feb. 26, 1952 |